United States Patent [19]

Reich

[11] 3,755,242

[45] Aug. 28, 1973

[54] POLYCARBODIIMIDE PREPOLYMERS
[75] Inventor: Charles Reich, Saint Paul, Minn.
[73] Assignee: Minnesota Mining and Manufacturing Company, St. Paul, Minn.
[22] Filed: Apr. 10, 1972
[21] Appl. No.: 242,838

[52] U.S. Cl. .......................... 260/37 N, 260/77.5 R
[51] Int. Cl. ............................................. C08g 22/00
[58] Field of Search ..................... 260/77.5 R, 37 N, 260/2.5 BF

[56] References Cited
UNITED STATES PATENTS
3,640,966  2/1972  Hennig et al. .................. 260/2.5 BF
3,657,161  4/1972  Bernard et al. ................. 260/2.5 BF
2,941,966  6/1960  Campbell ....................... 260/2.5 BF Primary Examiner—Donald E. Czaja
Assistant Examiner—M. J. Welsh
Attorney—Kinney, Alexander, Sell, Steldt & Delahunt

[57] ABSTRACT

A new class of isocyanate-terminated solid, soluble, fusible, storable prepolymers suitable for producing high molecular weight polycarbodiimides; formed from polycarbodiimide-forming polyisocyanate monomers having a melting point below 200° C., said prepolymers comprising a mixture of liner chains of polycarbodiimides and said monomers, said mixture containing about 2 to 95 percent of the original isocyanate nitrogen in the form of polycarbodiimide. The prepolymer can be in admixture with a catalyst and solvent for said catalyst for further formation or polycarbodiimide.

27 Claims, No Drawings

POLYCARBODIIMIDE PREPOLYMERS

BACKGROUND OF THE INVENTION

This invention relates to isocyanate-terminated solid, soluble, fusible, storable precursor for polycarbodiimide. In another aspect, it relates to the production of mixtures of prereacted monomers useful as storable prepolymers for producing high molecular weight polycarbodiimides. In yet another aspect, it relates to prepolymers useful for producing polycarbodiimide foams, films and molded articles.

DESCRIPTION OF THE PRIOR ART

The general production of polycarbodiimides from diisocyanate precursors has been disclosed in the art, U. S. Pat. Nos. 2,941,966 and 2,941,983. Further, the preparation of an isocyanate-terminated carbodiimide has been disclosed in the Journal of Organic Chemistry, Vol. 28, page 2069 (1963), and the preparation of a carbodiimide oligomer which is isocyanate-terminated was disclosed in U.S. Pat. No. 3,522,303. The prior art also discloses the use of numerous catalysts which may be used in the production of polycarbodiimides. U.S. Pat. No. 2,941,966 discloses the use of phosphorus-containing compounds which are particularly desirable in the production of polycarbodiimides, and U.S. Pat. No. 3,522,303 discloses heterocyclic phosphorus-containing compounds such as 2-substituted 1,3,2-diazaphospholane-2-oxides which can be used to form low molecular weight polycarbodiimide oligomers.

It is believed that all of the prior art disclosures relate to oligomers or polymers having limited usefulness in the production of high molecular weight polycarbodiimide materials or foam. The previous disclosures describe, e.g., high molecular weight polycarbodiimide polymer which is virtually insoluble and non-fusible, and once this high molecular weight polycarbodiimide is formed, it is extremely difficult, if not impossible, to form the polymer into articles of useful shape and size. So far as is known, it was not possible heretofore to produce a storable prepolymer which retained the ability to form polymers of high molecular weight. This limited the possible applications for the high molecular weight polycarbodiimides using prior art disclosures.

Formerly, production of a high-molecular weight polycarbodiimide by the ultimate user required the use of toxic liquid components such as tolylene diisocyanate, making the production of polycarbodiimides dangerous both in increased hazards to working personnel and the danger of pollution to the surrounding area. The insolubility of the high molecular weight polycarbodiimides was also a limiting factor to extending the use of these polymers, even though the polymers themselves exhibit many desirable characteristics such as thermostability, good electrical properties, solvent resistance, and toughness properties together with being relatively low in cost.

The preparation of isocyanate-terminated carbodiimide oligomers of low molecular weight such as those disclosed in the Journal of Organic Chemistry (supra), while resulting in oligomers useful, e.g., for addition to other polymer systems, yields polycarbodiimide oligomers without the ability to react further to form polycarbodiimides as such since in the disclosed procedures, the catalyst is removed from the system to prevent further reaction and there is no catalyst available for further polymerization. After the initial reaction, the prior art oligomers will not react further unless additional catalysts are provided to catalyze the carbodiimide reaction to completion. However, it is believed that additional catalyst to form further carbodiimide linkages could not be added in a controllable manner to the prior art systems.

The prepolymer of this invention consists essentially of a mixture of isocyanate-terminated monomers and oligomers, the mixture containing from 2 to 95 percent of the original isocyanate in the form of carbodiimide linkages. The oligomers present contain from 1 to 17 intraliner carbodiimide linkages and are isocyanate-terminated.

The prepolymer of this invention does not have the undesirable non-solubility, infusibility shortcomings of the prior art oligomers. Polymers made from the prepolymer of this invention retain the desirable characteristics of polycarbodiimides such as solvent resistance, toughness, and good electrical properties but in addition have several distinctly desirable advantages such as the ability to be formed by electrostatic spray, flame spray, fluidized bed, solution casting, or molding, which are unique to the prepolymer of this invention.

Briefly, the prepolymer is solid, soluble, and fusible polycarbodiimide prepolymer having aromatic radicals bonded to carbodiimide groups, the said prepolymer being isocyanate end-capped and substantially homogeneously mixed with a catalyst which promotes further polymerization of the prepolymer. The prepolymer-catalyst mixture is storable at low to moderate temperatures as further explained hereinafter. Upon the application of heat, the reaction of the isocyanate-terminated carbodiimide prepolymer will continue, forming a high molecular weight polycarbodiimide from a one-part prepolymeric source.

The prepolymers of the invention include monomers and low molecular weight prepolymers having the following structure: O=C=N—Ar—[+Q+$_a$N=C=N—Ar—]+$_n$Q+$_a$N=C=O wherein Ar is a divalent arylene radical chosen from the class consisting of:

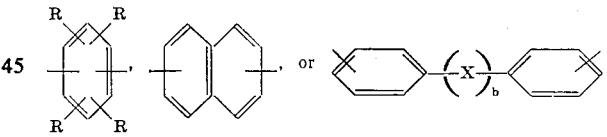

wherein R may be hydrogen, chloro or methyl, b is 0 or 1, and when b is 1, X is —CH$_2$—, —O—, —S—, or —SO$_2$—; Q is a divalent radical having the formula:

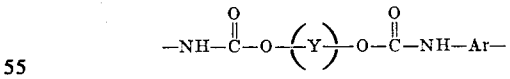

wherein Y is the residue of a glycol devoid of its terminal hydroxyl moieties; "a" can be 0 or 1; when "a" is 0, n has a value from about 5 to 17, and when "a" is 1, n has a value from about 1 to 5. It will be understood that the chain length of the individual polymer chains in any given prepolymer mixture will vary, i.e., shorter and longer chains can be present at the same time.

DESCRIPTION OF THE PREFERRED EMBODIMENT

The prepolymers of the present invention are best made by dissolving a phosphorus-containing catalyst such as 1-phenyl-3-methyl-2-phospholene-1-oxide in a suitable solvent using just sufficient solvent to dissolve the catalyst, and adding the dissolved catalyst to the liquid organic polyisocyanate, e.g., tolylene diisocyanate. The addition of the catalyst is approximately about 0.1 to 5 percent by weight of the polyisocyanate with 0.2 to 1 percent by weight of the polyisocyanate being preferred, the catalyst being added to the liquid polyisocyanate. Where solvent is used no solvent other than that necessary to dissolve the catalyst is employed in the production of this latent one-part prepolymeric source of polycarbodiimide. The use of solvent in excess of that necessary to just dissolve the catalyst will favor the continued formation of carbodiimide and result in an insoluble, infusible polymer rather than prepolymer which is both soluble and fusible. Mixtures of the different polyisocyanates compounds can be used. Thus, where tolylene diisocyanate is used, the isocyanate may be 100 percent by weight of 2,4-tolylene diisocyanate or a mixture of 80 percent by weight of 2,4-tolylene diisocyanate and 20 percent by weight of 2,6-tolylene diisocyanate.

Useful diisocyanates include those which are liquid at temperatures where the addition of the active catalyst does not cause polymerization to a high molecular weight, insoluble, infusible polymer. The diisocyanates useful in this invention are chosen by their melt temperature. Representative diisocyanates include 2,4-tolylene diisocyanate; 4,4′-methylene (di-p-phenylene) diisocyanate; 4,4′-diphenylene diisocyanate; 2,6-tolylene diisocyanate, m-phenylene diisocyanate; 1,5-naphthylene diisocyanate, durene diisocyanate, xylene diisocyanate, 1,8-naphthalene diisocyanate; 4,4′-oxy(di-p-phenylene) diisocyanate; 4,4′-thiooxy(di-p-phenylene) diisocyanate; 2,2′-dichloro-4,4′-methylene (di-p-phenylene) diisocyanate; bis(4-isocyanatophenyl) sulfoxide. Mixtures of two or more diisocyanates may also be used.

Mixtures of the diisocyanates with organic tri- or higher isocyanates can be used in the practice of this invention where the resulting mixture has an average isocyanate functionality from about 2.00 to 2.15. Examples of suitable tri- or higher isocyanates are the polyaryl polyalkylene polyisocyanates as described in Encyclopedia of Chemical Technology, Othmer & Kirk, Vol. 12, pp. 46-47, Interscience Pub. (New York, 1962).

Low molecular weight organic polymers having free isocyanate groups may also be used to form the novel isocyanate-terminated prepolymers of this invention. Useful isocyanate-containing compounds can be prepared by reacting a polymeric material which contains terminal hydroxyl, amino, or carboxyl groups with excess polyisocyanate. The isocyanate-terminated polymers can be prepared before the carbodiimide catalyst is added or the isocyanate-terminated polymer may be generated in the presence of the carbodiimide catalyst.

When a glycol, e.g., a polyalkyleneether glycol, is used to form isocyanate-terminated prepolymers used in this invention, as isocyanate-terminated polyether polyurethane is obtained upon reaction of the glycol with a molar excess of an organic diisocyanate. Representative glycols which may be reacted with an organic diisocyanate include polyalkyleneether glycols, polyalkylenearyleneether glycols, polyalkyleneether-thioether glycols, polyalkylenearyleneetherthioether glycols, polyester glycols, polyhydrocarbon glycols, etc. Polyalkyleneether glycols such as polyethyleneoxide, polypropyleneoxide, and polytetramethyleneoxide glycols, alkyleneether-thioether glycols, such as thiodiethanol, and hydrocarbon glycols such as 1,4-butanediol, ethylene glycol, propylene glycol, 1,5-pentanediol, octylene glycol, 2-ethyl-2-butyl-1,3-propanediol, 2,2,-diethyl-1,3-propanediol, 2-ethyl-1,3-hexanediol, and hexylene glycol are preferred.

The urethane moiety present when a polyol is used to form the prepolymer of this invention imparts flexibility and toughness to the cured polycarbodiimide formed from the prepolymers. Polyalkyleneether glycols, such as polypropylene glycol, provide polycarbodiimides with the greatest degree of flexibility, while polyhydrocarbon glycols, such as 1,4-butanediol provide a degree of flexibility intermediate between polyalkyleneether glycols and the aromatic diisocyanates. Use of a thioether glycol, such as thiodiethanol, imparts increased solvent resistance to polycarbodiimides formed from said thioethers.

For forming the low molecular weight prepolymer of this invention, the isocyanate equivalent weight of the diisocyanate-terminated monomer or mixture of polyisocyanates monomers as described herein should be about 80-400, with a preferred range of about 87-250. Where the equivalent weight is greater than 400, the polycarbodiimide formed will not be a soluble, frangible prepolymer but a rubbery, elastomeric material, which is not latent at room temperature and ultimately reacts completely to form a high molecular weight polymer. When the equivalent weight of the monomer falls below 80, reaction will not occur to form the friable, fusible, soluble, prepolymer of this invention.

The isocyanates useful for forming a soluble, fusible, frangible prepolymer will have a melting temperature less than 200° C. with a preferred melting point of 40° C. or less. Depending on the particular carbodiimide-forming diisocyanates selected, the reaction mixture can reach a non-tacky, frangible, fusible, soluble solid state when from 2 to about 95 percent of the isocyanate originally present has reacted to carbodiimide. For example, durene diisocyanate becomes solid at about 2 percent reaction and a reaction mixture comprising 80/20 2,4-2,6 tolylene diisocyanate terminated 1,4-butanediol becomes solid at about 16 percent reaction.

The degree of reaction may be extended by heat aging the solid product above room temperature, preferably from about 40° C. to about 80° C. Heating the 80/20 2,4-2,6 tolylene diisocyanate terminated 1,4-butanediol mentioned above for 24 hours at 70° C. advanced the reaction from about 16 percent to 53 percent completion.

When the starting reactant is tolylene diisocyanate, the reaction mixture becomes a solid in a short period of time at 25° C. and is approximately 50 percent reacted into a carbodiimide structure when first solidified. The solid will continue to react and will form a non-tacky mass after several hours at 25° C. the solid product of this reaction is an isocyanate-terminated polycarbodiimide prepolymer of the approximate structure:

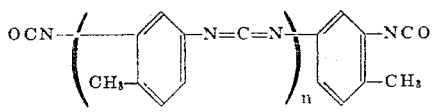

I $n$=about 10 for 80/20 2,4/2,6 tolylene diisocyanate
$n$=about 6 for 100 percent 2,4-tolylene diisocyanate, with the 2,4-tolylene diisocyanate reaching a non-tacky state by a rate, an order of magnitude faster than the 80/20 2,4/2,6 mixture The material produced by this reaction displays infrared absorption spectra with typical isocyanate and carbodiimide peaks. It melts at 55–75° C. and is very soluble in methylene chloride and toluene. An isocyanate equivalent weight of approximately 500 (corresponding to about 85 percent reaction) was obtained from the reaction when using a starting mixture of 100 percent 2,4-tolylene diisocyanate and an isocyanate equivalent weight of about 650 (corresponding to 88 percent reaction) from 80/20 2,4-/2,6-tolylene diisocyanate.

The chemical reaction proceeds rapidly but nonexothermically when the catalyst solution is added to the polyisocyanate, e.g., tolylene diisocyanate, at room temperature with the reaction mixture evolving carbon dioxide and turning to a solid. Such prepolymers are solid when they contain about 5 to 25 percent of the isocyanate groups originally present.

When the diisocyanate is a solid at room temperature, the preparation of the polycarbodiimide prepolymer of this invention is carried out at a temperature sufficiently high to melt the diisocyanate. Thus, for example, when the polycarbodiimide is prepared from durene diisocyanate, the diisocyanate is heated to the melting point (about 113° C.) and the catalyst added to the liquid diisocyanate. The reaction mixture is then cooled more or less rapidly in accordance with the degree of reaction which is desired. The mixture evolves carbon dioxide and becomes a non-tacky solid.

The solid non-tacky mass of prepolymer is easily pulverized using a mortar and pestle. The powder retained its melting point of approximately 60° C. and its solubility in methylene chloride for up to one month when stored at room temperature.

The powdered prepolymers of this invention are moderately soluble in aromatic solvents, e.g., benzene and toluene, and readily soluble in chlorinated aromatic and aliphatic solvents, e.g., methylene chloride and chlorobenzene. It is preferable when the powder is to be stored more than one month, that the powder be stored at reduced temperatures, e.g., 0°–5° C. At reduced temperatures, the shelf life of the prepolymer is about one year before the material loses so much of its capability of forming a polycarbodiimide foam that it is no longer useful.

After storage, the prepolymer of this invention can be cured to the desired form. When heated to 100° C. the powdered prepolymer melts and the polymerization reaction continues at the curing temperature of from about 75° to 200° C., to produce a high molecular weight polycarbodiimide.

In order to form the useful prepolymers of this invention the catalyst chosen must have limited activity at room temperature. Additionally, the catalyst must cause further polymerization when the prepolymers of this invention are reheated to curing temperatures of up to 200° C., the preferred range of curing temperatures being 100°–150° C.

Suitable catalysts useful for forming the prepolymers of this invention include phospholines, phospholine oxides and sulfides, phospholidines and phospholidine oxides and sulfides.

Useful phospholine oxides and sulfides are described in U.S. Pat. Nos. 2,663,737 and 2,663,738. Phospholidene oxides are disclosed in U.S. Pat. No. 2,663,739 and phospholines and phospholidine are described in U.S. Pat. No. 2,663,736. Representative compounds useful in forming the claimed prepolymers of this invention include 1-phenyl-3-phospholine, 3-methyl-1-phenyl-3-phospholine, 3-(4-methyl-3-pentenyl)-1-phenyl-3-phospholine, 3-methyl-1-phenyl-3-phospholine-1-oxide, 1-ethyl-3-methyl-3-phospholine-1-sulfide, 1-phenyl-phospholidine, 3-methyl-1-phenyl-phospholidine. The presently preferred catalyst is 3-methyl-1-phenyl-2-phospholene 1-oxide.

The claimed prepolymer displays reduced toxicity over the previous monomeric polycarbodiimide diisocyanate precursors, most of which are inhalation hazards owing to their high volatility and toxicity. Prior to this invention, applicant knows of no means of producing the high molecular weight polycarbodiimides other than directly from the toxic monomeric diisocyanates.

The prepolymers of this invention have utility in isocyanate chemistry as diisocyanate precursors for producing polyurethanes, polyureas, polyamides, etc. This utility is obtained by removal of the active carbodiimide-forming catalyst by contacting said prepolymer with a Lewis or Bronsted acid, e.g., boron trifluoride etherate according to the method of Campbell and Smeltz, J. Org. Chem., 28, 2072 (1963).

Another method for destroying the active catalyst is to incorporate a latent source of acid, such as triethylamine boron trifluoride etherate, into the prepolymer-catalyst mixture. By heating this mixture at a temperature above that required for formation of the prepolymer, acid is liberated and the polycarbodiimide catalyst is deactivated. These methods result in the elimination of the capability for further carbodiimide formation upon application of heat to the prepolymers thus making the isocyanate end groups available for reaction with hydroxyl, amine, carboxyl, etc. groups.

Polyurethanes, polyureas, polyamides, etc. prepared by use of the prepolymer of the invention have increased oxidative, thermal, and hydrolytic stability generally associated with the carbodiimide linkage (see U.S. Pat. Nos. 3,502,722; 3,378,517; 3,346,496; 3,193,525; 3,224,348; 3,193,522; and 3,193,523).

In some cases the active catalyst need not be removed before reaction of the isocyanate end groups of the prepolymer with other functionality. This is the case whenever the rate of reaction of carbodiimide formation is significantly slower than the reaction between the isocyanate groups of the prepolymer and the newly introduced functionality, e.g., employing amine-isocyanate reaction to give urea, carboxyl-isocyanate catalyzed reaction to give amides, and hydroxyl-isocyanate reaction in the presence of a urethane catalyst to give urethanes.

The powdered prepolymers of the invention are moisture-insensitive, as contrasted with, e.g., the highly volatile toxic toluene diisocyanate which is liquid and moisture sensitive under normal conditions. The powder also provides a latent one-part source of polycarbodiimide foam which can be formed merely by heating this new mixture of isocyanate end-capped prepolymers and catalyst. The prepolymer of this invention can also be produced in various forms, e.g., sticks, blocks, or spheres which are useful in a wide variety of pressing, filling, or extruding operations. The prepolymers of this invention are particularly useful when produced in filled and unfilled powdered forms.

To produce a molded part of polycarbodiimide foam from the powdered prepolymer, one simply places the powder in suitable mold of the desired shape and size and applies heat at approximately 75°–200° C. for a short period of time. The prepolymer mixture quickly begins to cure at the elevated temperature to form a flexible to rigid, high molecular weight polycarbodiimide foam in the mold without the addition of any catalytic agents, blowing agents, or reactants. Upon heating to higher temperature, e.g., 400° C., the foams continue to cure forming a rigid thermoset material.

In addition to producing a polycarbodiimide foam, it is possible to incorporate a wide variety of nonsolvent liquid or solid agents into the prepolymer mixture to obtain desirable properties.

The preferred method of adding these agents to the prepolymer is to add the selected material directly to the liquid diisocyanate or the isocyanate-terminated urethane starting mixture and the solution of the chosen catalyst. Formation of the prepolymer takes place encapsulating the filler particles in the novel isocyanate-terminated prepolymer. The liquid diisocyanates and the isocyanate-terminated prepolymer provide very effective wetting of the filler material which results in homogeneous dispersion of the filler material and allows volume loadings in excess of 60 percent by volume of filler material.

Useful fillers can be chosen from solid or liquid additives which are unreactive with the organic polyisocyanate or the polycarbodiimide and which do not prevent the formation of a nontacky prepolymer. Examples of fillers which may be used are powdered metals, e.g., aluminum, bronze, copper, iron, zinc; plastic powders, e.g., polyethylene, polypropylene, polyacrylonitrile-polybutadiene-polystyrene, natural and synthetic rubbers; scrap rubber; minerals, e.g., pumice, aluminum oxide, garnet, quartz, feldspar, or other abrasive materials; silicates, e.g., diatomaceous earth, aluminum silicate clay, mica, asbestos; metal oxides, e.g., iron oxide, zinc oxide, titanium oxide, magnesium oxide; ferrites, e.g., zinc ferrite; and metal sulfides, e.g., iron sulfide, zinc sulfide, lead sulfide; and miscellaneous solid fillers such as graphite, carbon black pigments, glass fibers, and metal fibers.

The fillers can be incorporated at volume loadings from a fraction of a percent to 60 percent or more. With none or very low loadings on the order of 0.5 – 2 percent, the fillers have the effect of substantially reducing the density of the cured foam giving foams with a density as low as one pound per cubic foot. Where the loading of the polycarbodiimide prepolymer is intermediate, about 20–40 percent by volume, there is little change in the foam densities as compared to a pure carbodiimide foam prepared from comparable unloaded prepolymers. At high loadings where the filler is greater than 50 percent by volume, the cured polycarbodiimide product is a dense foam. The fillers can be incorporated into the prepolymer at volumes up to 60 percent and more of the total volume of the system.

The type of foam produced can be varied by mixing other isocyanates with tolylene diisocyanate. For example, a mixture of 90 percent by weight tolylene diisocyanate and 10 percent by weight polymethylene polyphenyl isocyanate, ("Isonate") when reacted by the process disclosed in this application and the resulting prepolymer ground to a powder and heated, produced a polycarbodiimide with a very uniform, fine-celled, rigid foam. These foams are particularly amenable to pigmentation making them useful in the production of decorative items. By utilizing a closed mold operation, one can prepare self-skinning, rigid structural foams having a thick outer skin useful for producing furniture or items useful as structural members.

The filled prepolymer of the invention have utility in solder applications as a substitute for metal solders such as lead-tin alloys. For example, highly filled prepolymers are useful as a lead solder substitute in automobile body applications. The present state-of-the-art consists of melting bars of lead solder and buttering the molten solder via a spatula into the automobile welded seams. The solder filler is then ground to a feathered edge. This method is slow and requires a high degree of skill to achieve a satisfactory result. Furthermore, the fine lead dust produced during the grinding step is a definite health hazard.

Fillers that may be used in relatively large proportions to fill the prepolymers of the invention to prepare metal solder substitutes include metal powders, e.g., aluminum powders; metal oxides, e.g., iron oxide; silicates, e.g., silica and asbestos; and ferrites, e.g., zinc ferrite, and mixtures thereof. These polycarbodiimide metal solder substitutes obviate problems associated with the conventionally used lead solders. The filled prepolymers used as solders can be flame sprayed on to the surface to be coated via a gas or propane fuel and oxygen or air torch. When used as a solder, the filled prepolymer cures upon heating to a high molecular weight polycarbodiimide and upon cooling, is immediately ready for grinding and does not present the health hazards associated with lead solder.

Advantages of this invention are further illustrated by the following examples. The particular amounts and materials recited in these examples, as well as other conditions and details, should not be construed as limiting the scope of this invention. The prepolymers formed in these examples are storable at room temperature or below. All percentages are by weight unless otherwise stated.

EXAMPLE 1

20 milliters of a 50 percent volume per volume solution of 1-phenyl-3-methyl-2-phospholene-1-oxide in methylene chloride were added to and mixed with 1,025 grams of 2,4-tolylene diisocyanate at room temperature. Immediate and vigorous evolution of carbon dioxide occurred, the reaction proceeding as shown in Table I.

TABLE I

| Reaction Time (min.) | Weight Loss of $CO_2$* (gm) | Reaction % Completion |
|---|---|---|
| 15 | 100 | 39 |
| 30 | 154 | 59 |
| 45 | 180 | 69 |
| 60 | 187 | 72 |
| 90 | 193 | 75 |
| 150 | 198 | 76 |
| 240 | 202 | 78 |
| 24 hrs. | 213 | 82 |
| 96 hrs. | 218 | 84 |

*Theoretical weight loss of $CO_2$ is 259 gm.

The reaction mixture solidified after approximately 17 minutes, and reached a nontacky state after approximately 240 minutes. The solid mass was easily pulverized to a fine powder using a mortar and pestle. The resulting powdered prepolymer was soluble in methylene chloride and was also moderately soluble in toluene. The powder proved to be insoluble in acetone, methyl ethyl ketone, cellosolve acetate, and alcohol. The powder showed a melting point of 55°–75 °C., and the infrared absorption spectrum showed in intense carbodiimide formation and moderate absorption at the isocyanate absorption wavelength. A sample of the powdered material was exposed to air for several days and showed no urea formation or degradation. After 2 months of aging, the powder at approximately 25° C., an aliquot of the powder was titrated, and an isocyanate equivalent weight of 481 was found corresponding to approximately an 85 percent reaction. The powder has extended latency of up to one year when stored at 5° C.

EXAMPLE 2

8 milliliters of a 50 percent volume-per-volume solution of 1-phenyl-3-methyl-2-phospholene-1-oxide in methylene chloride solvent were added to and mixed with 3600 grams of 80 percent 2,4-tolylene diisocyanate and 20 percent 2,6-tolylene diisocyanate plus 400 grams of polymethylene polyphenyl polyisocyanate, ("Isonate" 390-P, having an isocyanate equivalent weight of about 139 and a functionality of about 2.3), at room temperature. An immediate vigorous evolution of carbon dioxide occurred with the reaction proceeding as shown in TABLE II:

TABLE II

| Reaction Time (min.) | Weight Loss of $CO_2$* (gm) | Reaction % Completion |
|---|---|---|
| 5 | 29 | 3 |
| 8 | 89 | 9 |
| 11 | 149 | 15 |
| 15 | 199 | 20 |
| 18 | 249 | 25 |
| 23 | 299 | 31 |
| 29 | 349 | 36 |
| 35 | 399 | 41 |
| 47 | 449 | 46 |
| 55 | 474 | 48 |
| 65 | 494 | 51 |
| 78 | 524 | 53 |
| 97 | 549 | 56 |
| 137 | 589 | 60 |
| 160 | 606 | 62 |
| 180 | 617 | 63 |
| 218 | 637 | 65 |
| 245 | 654 | 67 |
| 24 hrs. | | 87 |

*Theoretical Weight loss of $CO_2$ is 980 gm.

The reaction mass became very viscous after about 4½ hours of reaction and achieved a solid nontacky state after 24 hours of reaction. The solid mass was easily pulverized into a fine powder which was soluble in methylene chloride and also soluble in toluene. The powder had a melting point of 55°–75° C. The infrared spectrum of this material showed a strong absorption peak at the carbodiimide wavelength and moderate absorption at the isocyanate wavelength. An isocyanate equivalent weight of 700 was found by titration with di-n-butylamine after 24 hours of reaction.

EXAMPLE 3

46 milliliters of a 50 percent volume-by-volume solution of 1-phenyl-3-methyl-2-phospholene-1-oxide were mixed with 2,310 grams of 80-20 2,4-2,6-tolylene diisocyanate at room temperature.

The nontacky mass which was produced after 3 days of reaction at room temperature was easily pulverized to a powder. Physical properties for this material were similar to those in Example 1. After 18 days at room temperature, an isocyanate equivalent weight of 750 was obtained. The powder was curable upon heating. This sample was heat aged at 60° C. for 2 days to obtain an isocyanate equivalent weight of 1,162 (corresponding to 95 percent reaction) without loss of useful melting and solubility properties.

EXAMPLE 4

10 milliliters of a 50 percent volume-by-volume solution of 1-phenyl-3-methyl-2-phospholene-1-oxide in methylene chloride were mixed into 450 grams of 80 percent 2,4-tolylene diisocyanate and 20 percent 2,6-tolylene diisocyanate and 50 grams of polymethylene polyisocyanate. A polymeric fluoroaliphatic surfactant weighing 0.5 grams was added to the mixture. After 3 days at room temperature, the nontacky powder gave an isocyanate equivalent weight of 627 which was storable and curable with the surfactant evenly dispersed throughout the powder.

EXAMPLE 5

The procedure of Example 1 repeated with the addition of magnetite at 60 percent by weight of isocyanate. The powdered magnetite of about 400 microns diameter was added directly to the tolylene diisocyanate liquid. Formation of the storable, curable polycarbodiimide prepolymer proceeded as described in Example 1 with the magnetite being evenly dispersed in the resulting solid.

EXAMPLE 6

The powder produced by the procedures of Example 1 was heated at 100° C. for 1 hour and allowed to rise free of any external pressure. The powder, when heated, produced a tough, free-rise foam of 12 pounds per cubic foot density. When the heated foam was produced in a closed mold, structural foams of 24 pounds per cubic foot were produced.

EXAMPLE 7

The powder produced in Example 2 was heated at 100° C. for one hour giving a tough, rigid, free-rise foam of about 12 pounds per cubic foot density having fine, uniform cell structure.

EXAMPLE 8

Fifty (50) milliliters of a 50 percent volume-per-volume solution of 1-phenyl-3-methyl-2-phospholene-1-oxide in methylene chloride solvent were added to 2500 grams of a mixture of 80/20 isomeric mixture of 2,4/2,6-tolylene diisocyanate at room temperature. 2.5 grams of polymeric fluoroaliphatic surfactant were added to the reaction mixture, and the reaction was allowed to proceed as shown in Table III.

TABLE III

| Reaction Time (min.) | Percent Reaction |
|---|---|
| 5 | 12 |
| 10 | 24 |
| 15 | 40 |
| 20 | 48 |
| 25 | 55 |
| 33 | 62 |
| 40 | 65 |
| 45 | 67 |
| 55 | 71 |

63
83
134
184
283
454
24 hrs.

73
75
79
81
83
85
90

After 2 days at room temperature, the solid, nontacky reaction mass was easily pulverized with a mortar and pestle to a fine powder which was soluble in methylene chloride and tolylene. The powder had a melting point of 55°–75° C. Upon heating this powder to 100° C. for one hour, it melted and reacted further forming a 6 pound per cubic foot free-rise foam.

EXAMPLE 9

The procedure of the previous Example was repeated with the addition of 2 percent by total weight, of isocyanate, of pigment grade titanium dioxide, the titanium dioxide being added directly to the liquid isocyanate reactant. The pigment was uniformly dispersed in the reaction medium, and formation of the prepolymer proceeded as described in the previous example, with the pigment uniformly dispersed in the resulting solid. Upon heating a fine powder ground from the prepolymer at 100° C. for one hour, it melted and polymerized further, and a 3 pound per cubic foot foam of uniform cell size was formed. The addition of fine particles such as pigments having a diameter of a few microns to the isocyanate liquid results in a solid, soluble prepolymer which will form very light foams when cured, as in this example, a 3 pound per cubic foot foam.

EXAMPLE 10

The procedure of Example 3 was repeated with the addition of 80 percent by weight of isocyanate of aluminum powder added directly to the diisocyanate reactant. Formation of the prepolymer proceeded as in Example 3, and the nontacky mass was easily ground to a fine powder. The ground powder flowed easily after melting at 55°–75° C. and fused at higher temperature (100° C.) to a solid mass with little foam production.

EXAMPLE 11

The procedure of Example 10 was repeated substituting 320 mesh aluminum oxide powder for the aluminum powder. The resulting prepolymer was easily crushed to form a molding powder which forms little foam upon curing.

EXAMPLE 12

46 milliliters of a 50 percent (v/v) solution of 1-phenyl-3-methyl-2-phospholene-1-oxide in methylene chloride were added to 2,310 grams of 80/20 2,4/2,6-tolylene diisocyanate containing various amounts and types of filler material at room temperature.

In all cases, a nontacky mass was produced in about 3 days and the resulting mass was a frangible solid. The amounts of filler and results upon heating to 100° C. are shown in Table IV.

TABLE IV

| Run | Filler | Filler size, microns | Percent filler, by weight | Foam density, lbs./cu. ft. | Foam condition |
|---|---|---|---|---|---|
| 1 | Polystyrene expandable beads | 300–700 | 55 | 7 | Friable. |
| 2 | Scrap rubber particles | 200–500 | 50 | 12 | Do. |
| 3 | Corn starch | | 25 | 3 | Do. |
| 4 | do | | 50 | 48 | Strong. |
| 5 | do | | 63 | 62 | Do. |
| 6 | Polypropylene | 200–500 | 50 | 12 | Do. |
| 7 | Graphite | 1–10 | 50 | 42 | Friable. |
| 8 | Titanium dioxide | (¹) | 4 | 2 | Strong. |
| 9 | do | (¹) | 24 | 6 | Do. |
| 10 | do | (¹) | 39 | 12 | Do. |
| 11 | do | (¹) | 50 | 42 | Do. |
| 12 | Polyvinylchloride | 500–1,000 | 50 | 30 | Do. |
| 13 | Clay | 5–20 | 25 | 3 | Friable. |
| 14 | do | 5–20 | 50 | 27 | Do. |
| 15 | do | 5–20 | 65 | 9 | Do. |
| 16 | Wood flour | 1–10 | 23 | 36 | Strong. |
| 17 | Asbestos | 1–10 | 9 | 24 | Do. |
| 18 | do | 1–10 | 25 | 62 | Do. |
| 19 | Talc | 1–10 | 41 | 24 | Friable. |
| 20 | Carbon black | (¹) | 50 | 36 | Do. |
| 21 | Diatomaceous earth | (¹) | 25 | 10 | Do. |
| 22 | do | (¹) | 50 | 42 | Do. |
| 23 | Mica | 5–20 | 50 | 42 | Strong. |
| 24 | Sulfur | 5–10 | 25 | 6 | Do. |
| 25 | do | 5–10 | 25 | 5 | Do. |
| 26 | do | 5–10 | 50 | 17 | Do. |
| 27 | Fly ash | (¹) | 25 | 4 | Friable. |
| 28 | do | (¹) | 50 | 62 | Strong. |
| 29 | Concrete dust | (¹) | 57 | 4 | Do. |
| 30 | Charcoal | (¹) | 25 | 62 | Do. |
| 31 | Zinc ferrite | (¹) | 25 | 3 | Do. |
| 32 | do | (¹) | 50 | 16 | Do. |
| 33 | Iron oxide | (¹) | 50 | 16 | Do. |

¹ Submicron.

EXAMPLE 13

One millimeter of a 50 percent volume-by-volume solution of 1-phenyl-3-methyl-2-phospholene-1-oxide in methylene chloride was mixed into 50 grams of polymethylene polyisocyanate, a crude form of 4,4'-diisocyanate-diphenylmethane. The reaction proceeded as in Example 1 to give a solid, nontacky mass which could be easily ground to a fine powder. The powder was soluble in methylene chloride and toluene and melted at 55°–75° C. This powder, upon heating to 100° C., melted and cured to foam of a highly friable nature.

EXAMPLE 14

The procedure of Example 9 was repeated with the addition of 30 percent titanium dioxide by weight of the isocyanate. Formation of the prepolymer proceeded as in Example 8 with the pigment uniformly dispersed in the resulting solid. The solid was ground to a fine powder and cured at 100° C. for one hour forming a 7 lb./ft.³ foam of uniform cell size.

EXAMPLE 15

10 grams of cold (5° C.) 1,4-butanediol (0.22 equivalent) was added to 40 grams (0.46 equivalent) of cold (5° C.) 80/20 2,4-2,6-tolylene diisocyanate. To the solution was added 0.05 gram of a fluorochemical nonionic surfactant and 2 ml. of a 50 percent (v/v) solution of 1-phenyl-3-methyl-2-phospholene-1-oxide in methylene chloride solution. Upon mixing, an exothermic reaction occurred which heated the mixture to 100° C. and the mixture was immediately cooled with "Dry Ice" to 5°]C. The reaction mixture then was slowly allowed to warm from 5° C. to 22° C. over an 8 hour period and the reaction allowed to continue for 3 days. The solid, nontacky reaction mass was easily pulverized to a fine powder which was soluble in methylene chloride and had a melting point of 53°–75° C. The infrared absorption showed carbodiimide, urethane, carboxyl, and isocyanate peaks. The reaction mixture had an isocyanate equivalent weight of 757. A sample of the powder was heated at 100° C. for 1 hour forming a low density, semi-rigid foam.

EXAMPLE 16

Varying equivalents of the glycols shown in Table V were added to 45.0 grams (0.48 equivalents) of an 80/20 2,4- 2,6-tolylene diisocyanate at 5° C. To the resulting solution were added 0.05 gram of fluorochemical nonionic surfactant and 2.0 ml. of a 50 percent (v/v) solution of 1-phenyl-3-methyl-2-phospholene-1-oxide in methylene chloride. The reaction mixture was slowly allowed to warm from 8° C. to 22° C. over an 8 hour period.

After about 3 days at room temperature, the solid, nontacky, reaction mixtures were easily pulverized to fine powders. The powders were soluble in methylene chloride and melted at 55°–71° C.

Infrared absorption showed carbodiimide, urethane-carbonyl, and isocyanate peaks.

A sample of the powders heated at 100° C. for 1 hour gave low density (3–6 pounds per cubic foot), semi-rigid foams.

TABLE V

| Glycol | Glycol, eq. weight | Glycol, eq. added | Calculated isocyanate [1] |
|---|---|---|---|
| Run: | | | |
| 1..... Polyoxyethylene glycol.... | 50 | 0.10 | 121 |
| 2..........do..................... | 100 | 0.13 | 149 |
| 3..... 1,5-pentanediol............ | 52 | 0.10 | 121 |
| 4..... 1,4-butanediol............. | 45 | 0.11 | 125 |
| 5..........do..................... | 45 | 0.22 | 199 |
| 6..... Dioxypropylene glycol..... | 67 | 0.07 | 112 |
| 7..... 1,8-octylene glycol........ | 73 | 0.07 | 114 |
| 8..... Trioxypropylene glycol.... | 95 | 0.05 | 106 |
| 9..... Polyoxypropylene glycol.. | 200 | 0.02 | 93 |

[1] Equivalent weight of monomer.

EXAMPLE 17

15 equivalents of various glycols were added to 3,000 grams (34.5 equivalents) of an 80/20 2,4-2,6-tolylene diisocyanate at 50° C. as shown in Table VI.

TABLE VI

| Glycol | Isocyanate eq. wt. of urethane monomer | Isocyanate eq. wt. of prepolymer |
|---|---|---|
| Run: | | |
| 1........... Triethanol glycol........ | 248 | 382 |
| 2........... Tripropylene glycol...... | 269 | 373 |
| 3........... Ethylene glycol.......... | 205 | 258 |
| 4........... Propylene glycol......... | 212 | 264 |
| 5........... Thiodiethanol............ | 235 | 311 |
| 6........... Butanediol............... | 219 | 280 |

To the resulting reaction medium maintained below 50° C. was added 3.51 grams of fluorochemical nonionic surfactant and 715 ml. of a 50 percent (v/v) solution of 1-phenyl-3-methyl-2-phospholene-1-oxide in methylene chloride. The reaction mixture was kept at a temperature below 50° C.

After 1 week at room temperature, the solid, nontacky, reaction mass was easily pulverized to fine powder. The powders were soluble in methylene chloride and melted at 55°–71° C.

Infrared absorption showed carbodiimide, urethane-carbonyl, and isocyanate peaks.

Samples of the powders heated at 100° C. for 1 hour gave low density (3–6 pounds per cubic foot) semi-rigid foams.

Run 6 of Table VI was advanced to an isocyanate equivalent weight of 457 upon heat aging for 24 hours at 70° C.

EXAMPLE 18

A mixture comprising 120 parts of 80/20 2,4-2,6 tolylene diisocyanate, 20 parts butanediol and 400 parts of aluminum powder was catalyzed with 1.2 parts of 1-phenyl-3-methyl-2-phospholene-1-oxide dissolved in 1.2 parts of methylene chloride. The resulting pasty mixture was immersed in a "Dry Ice" acetone bath for 5 hours. The mixture was warmed gradually to 25° C. over a 4 hour period and kept at 25° C. for 4 days at which time the mixture had reacted to form a friable solid prepolymer.

The resulting prepolymer was ground and placed in indentations formed in cold rolled sheet steel and subjected to a temperature of 205° C. for 5 minutes. A solid, void-free, metallic colored material was formed in the indentations, said material showing excellent adhesion to the cold rolled steel even when subjected to repeating heating and cooling cycles. The solid material can be shaped by sanding, and has utility as a metal solder in various metal working industries.

EXAMPLE 19

The product of Example 18 was ground to a fine powder which would pass through a 70 mesh screen.

The powder was placed in a conventional powder aspirator and blown with compressed air at the rate of 30–50 grams per minute through a propane gas flame at an operational temperature of about 1,900° C. furnished by a Bernz-O-Matic torch (available from Otto Bernz Co. Inc., Rochester, N.Y.). The powder was sprayed into a cavity about 3 inches long, 2 inches wide and ⅛ in. thick in a steel panel preheated to about 200° C. filling the cavity in about 1 minute. At the completion of flame spraying, the filled polycarbodiimide was fully cured. When sanded, the cured filled polycarbodiimide provided a dense, void-free, metallic appearing surface. The cured and sanded material exhibited good adhesion to the steel panel even where the coating was very thin.

Other fillers and fuels can be substituted for the aluminum and propane of this example with similar results.

EXAMPLE 20

Four mixtures comprising 120 parts of 80/20 2,4-2,6 tolylene diisocyanate and 20 parts of various glycols as shown in Table VII were maintained below 75° C. until reaction had ceased. After cooling to room temperature, a solution of 21 parts of 1-phenyl-3-methyl-2-phospholene-1-oxide dissolved in 12 parts of methylene chloride was incorporated into each of the reaction mixtures. Thereafter, 400 parts aluminum powder was added to each reaction mixture. After about 4 days at 25° C., friable solid filled prepolymers were obtained in each case.

TABLE VII

| Run | Glycol |
|---|---|
| 1 | Tripropylene glycol |
| 2 | Triethylene glycol |
| 3 | Thiodiethanol |
| 4 | Butanediol |

These materials had the same metal bonding characteristics and product utility as the composition of Example 18.

EXAMPLE 21

Molten 1-phenyl-3-methyl-2-phospholene-1-oxide 0.1 gram at 60° was added to 10.0 grams 0.093 equivalents of rapidly stirred molten durene diisocyanate at 113° C. No solvent was used in the reaction mixture. The mixture was quickly quenched using "Dry Ice" in less than 20 seconds to room temperature. The resulting product was a frangible solid with a melting point of 100°–104° C., soluble in methylene chloride and having an isocyanate equivalent weight of 115. The equivalent weight of the prepolymer shows that about 5 percent of the original diisocyanate has reacted to prepolymer having one carbodiimide link, the remaining diisocyanate functionality being unreacted.

When heated to 150° C. for 15 minutes, the prepolymer cured to a somewhat brittle high molecular weight polycarbodiimide as evidenced by strong carbodiimide and weak isocyanate absorptions in the infrared spectrum of the cured resin.

EXAMPLE 22

To 10.0 grams (0.08 equivalent) of rapidly stirred molten (39°–42° C.) 4,4'-methylene (di-p-phenylene diisocyanate) was added 0.1 gram of molten 1-phenyl-3-methyl-2-phospholene-1-oxide. No solvent was used in the reaction mixture. The mixture was quickly quenched using "Dry Ice" to room temperature in less than 20 seconds. After one day at room temperature, the reaction mixture was a frangible solid.

The resulting prepolymer was ground to a solid which was soluble in methylene chloride and had an isocyanate equivalent weight of 722. The infrared absorption spectrum showed moderate isocyanate and strong carbodiimide absorptions.

Upon heating to 150° C. the powder melted and polymerization continued to form a high molecular weight polycarbodiimide. The infrared spectrum of the cured polycarbodiimide showed little isocyanate absorption.

Modifications and alterations of this invention will become apparent to those skilled in the art without departing from the scope or the spirit of this invention, and it should be understood that this invention is not to be limited to the illustrative embodiments set forth herein.

What is claimed is:

1. An isocyanate-terminated solid, soluble, fusible, storable, prepolymer for the production of high molecular weight polycarbodiimides which consists essentially of linear chains having about 5–17 repeating units containing carbodiimide linkages formed from a mixture of preselected polycarbodiimide-forming polyisocyanate monomers, said mixture having an isocyanate functionality of about 2.0–2.15, said monomers having a melting point below 200° C. and said monomers having an isocyanate equivalent weight of about 80–400, said prepolymer being in admixture with catalyst for formation of polycarbodiimide and just sufficient inert, compatible solvent to dissolve said catalyst, said prepolymer containing about 5–25 percent of the isocyanate groups originally present in the monomers.

2. An isocyanate-terminated, soluble, storage-stable, fusible, solid prepolymer formed from polycarbodiimide-forming diisocyanate monomers which have melting points below 200° C. and which have an isocyanate equivalent weight of about 80–400, said prepolymer being in admixture with a catalyst for the formation of high molecular weight polycarbodiimide, said prepolymer comprising a mixture of linear chains having the formula:

$$O=C=N-Ar-[(-Q-)_a-N=C=N-Ar-]_n-(Q)_a N=C=O$$

wherein Ar is a divalent arylene radical chosen from the class consisting of:

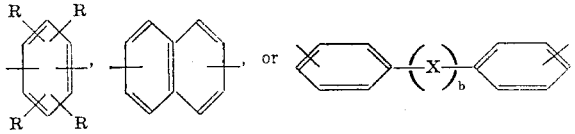

wherein R is hydrogen, chlorine or methyl, b is 0 or 1, and when b is 1, X is -CH$_2$-, -O-, -S-, or -SO$_2$-; and Q is a divalent radical having the formula:

$$-CH-\overset{O}{\underset{\|}{C}}-O-(Y)-O-\overset{O}{\underset{\|}{C}}-NH-Ar-$$

wherein Y is the residue of a glycol devoid of its hydroxy moieties; "a" can be 0 or 1; when "a" is 0, n has a value from about 5 to 17; and when "a" is 1, n has a value from about 1 to 5.

3. Prepolymer according to claim 2 which is in a finely divided free-flowing form.

4. Prepolymer according to claim 1 in which the catalyst is a 1-substituted phospholene oxide.

5. Prepolymer according to claim 4 in which said catalyst is 1-phenyl-3-methyl-2-phospholene-1-oxide.

6. Prepolymer according to claim 1 containing from about 2–60 percent by volume of finely divided, solid filler substantially homogeneously distributed therein.

7. Prepolymer according to claim 6 which is in a finely divided, free-flowing form.

8. Prepolymer according to claim 6 in which said filler is finely divided aluminum.

9. Prepolymer of claim 1 containing from 40–60 percent by volume of finely divided filler suitable for use as a metal solder.

10. Prepolymer according to claim 1 in which said diisocyanate monomer is hydrocarbon glycol end-capped with an aromatic diisocyanate.

11. Prepolymer according to claim 1 in which said diisocyanate monomer is a polyalkyleneether glycol end-capped with an aromatic diisocyanate.

12. Prepolymer according to claim 11 wherein said polyalkyleneether glycol is a polyethyleneoxide glycol.

13. Prepolymer according to claim 11 wherein said polyalkyleneether glycol is a polypropyleneoxide glycol.

14. Prepolymer according to claim 1 wherein said diisocyanate monomer is thiodiethanol end-capped with an aromatic diisocyanate.

15. Prepolymer according to claim 10 wherein said hydrocarbon glycol is a 1,4-butanediol.

16. Prepolymer according to claim 10 wherein said hydrocarbon glycol is ethylene glycol.

17. Prepolymer according to claim 10 wherein said hydrocarbon glycol is propylene glycol.

18. The prepolymer according to claim 10 wherein said hydrocarbon glycol is an octylene glycol.

19. Prepolymer according to claim 1 in finely divided, free-flowing form.

20. Prepolymer according to claim 1 wherein said monomer is 2,4-tolylene diisocyanate.

21. Prepolymer according to claim 1 wherein said monomer is a mixture of 2,4-2,6-tolylene diisocyanate.

22. Prepolymer according to claim 1 in which said catalyst is 1-phenyl-3-methyl-2-phospholene-1-oxide.

23. Prepolymer according to claim 1 containing from about 2–60 percent by volume of finely divided, solid filler substantially homogeneously distributed therein.

24. A method for producing an isocyanate-terminated, soluble, storage-stable, fusible, solid prepolymer formed from polycarbodiimide-forming polyisocyanate monomers which have melting points below 200° C. and which have an isocyanate equivalent weight of about 80–400, said prepolymer being in admixture with a catalyst for the formation of high molecular weight polycarbodiimide, said prepolymer comprising a mixture of linear chains having the formula:

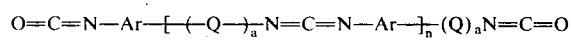

wherein Ar is a divalent arylene radical chosen from the class consisting of:

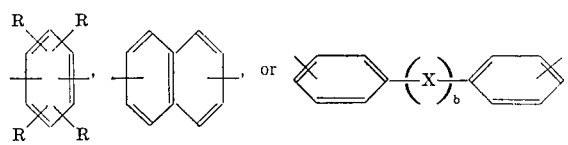

wherein R is hydrogen, chlorine or methyl, $b$ is 0 or 1, and when $b$ is 1, X is $-CH_2-$, $-O-$, $-S-$, or $-SO_2-$; and Q is a divalent radical having the formula:

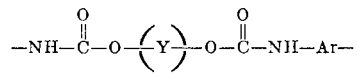

wherein "$a$" can be 0 or 1 when "$a$" is 0 and $n$ has a value from about 5 to 17 and when "$a$" is 1, $n$ has a value from about 1 to 5; comprising the steps of: mixing said polyisocyanate monomers with a suitable carbodiimide forming catalyst, containing just sufficient solvent to dissolve the catalyst; reacting the mixture at a temperature at which the monomer is molten and ranging from about 20° C. to about 200° C. to form a solid, soluble, fusible, storable prepolymer, said prepolymer containing about 5–95 percent of the isocyanate groups originally present in the monomer.

25. The method according to claim 24 wherein said temperature is less than 50° C.

26. The method according to claim 24 wherein said monomer has an isocyanate functionality of about 2.0–2.15.

27. Prepolymer of claim 1 wherein said diisocyanate monomer is a polyester glycol end-capped with an aromatic diisocyanate.

* * * * *

UNITED STATES PATENT OFFICE
CERTIFICATE OF CORRECTION

Patent No. 3,755,242     Dated August 28, 1973

Inventor(s) Charles Reich

It is certified that error appears in the above-identified patent and that said Letters Patent are hereby corrected as shown below:

Col. 4, line 59, "the" should be --The--;

Col. 13, line 12, delete "]".

Signed and sealed this 9th day of April 1974.

(SEAL)
Attest:

EDWARD M. FLETCHER, JR.
Attesting Officer

C. MARSHALL DANN
Commissioner of Patents